(12) United States Patent
Pineau et al.

(10) Patent No.: US 6,250,999 B1
(45) Date of Patent: Jun. 26, 2001

(54) MULTI-SPINDLE LAPPING MACHINE (75) Inventors: Jean Claude Pineau, Chailly en Biere; Richard Bonachera, Vincennes, both of (FR)

(73) Assignee: SPMS Honimatic, Luzy (FR)

( * ) Notice: Subject to any disclaimer, the term of this patent is extended or adjusted under 35 U.S.C. 154(b) by 0 days.

(21) Appl. No.: 09/139,769

(22) Filed: Aug. 25, 1998

Related U.S. Application Data (63) Continuation-in-part of application No. 08/928,761, filed on Sep. 12, 1997, now abandoned.

(51) Int. Cl.$^7$ ..................................................... B24B 41/00
(52) U.S. Cl. ........................................... 451/362; 451/366
(58) Field of Search ................................... 451/362, 363, 451/48, 51, 366, 381, 400; 408/35; 483/54, 55, 56

(56) References Cited

U.S. PATENT DOCUMENTS

| | | | |
|---|---|---|---|
| 1,241,964 | * 10/1917 | Grow et al. | 451/400 |
| 2,333,256 | * 11/1943 | Kline | 451/362 |
| 2,748,540 | * 6/1956 | George | 451/362 |
| 3,059,381 | * 10/1962 | Greening et al. | 451/124 |
| 4,621,407 | * 11/1986 | Suzuki | 451/35 |
| 4,833,764 | * 5/1989 | Muller | 408/35 |
| 4,922,595 | * 5/1990 | Hattori et al. | 451/362 |
| 5,088,237 | * 2/1992 | Nagel et al. | 451/51 |
| 5,298,844 | * 3/1994 | Nagasaki et al. | 408/35 |
| 5,667,425 | * 9/1997 | Pineau et al. | 451/51 |

FOREIGN PATENT DOCUMENTS

| | | | |
|---|---|---|---|
| 862129 | * 2/1941 | (AU) | 451/362 |
| 4430113 A1 | * 2/1998 | (DE) . | |
| 0862129 | * 2/1941 | (FR) | 451/362 |
| 2512724 | * 3/1983 | (FR) | 451/73 |
| 2654969 | * 5/1991 | (FR) . | |
| 0430817 A1 | * 6/1991 | (FR) . | |
| 0022457 | * 10/1913 | (GB) | 451/362 |
| 1337272 | * 11/1973 | (GB) . | |

OTHER PUBLICATIONS

Brochure entitled "Stäubli", (publication date not indicated).*
Brochure entitled "Trimate", (publication date not indicated).*

* cited by examiner

*Primary Examiner*—Derris H. Banks
(74) *Attorney, Agent, or Firm*—Smith, Gambrell & Russell (57) ABSTRACT

Lapping machine comprising a revolving turret (11) carrying at least several laps (13 to 17) that can be brought selectively into the machining position so that the laps can machine, in turn, one and the same cylindrical internal surface of a component.

The laps comprise at least one expansion lap (17) and several progressive laps (15). The expansion lap (17) preferably has a stationary connector part (20) on its non-rotating part that can be coupled automatically to a moving connector part (21) when the expansion lap is in the machining position.

16 Claims, 6 Drawing Sheets

MULTI-SPINDLE LAPPING MACHINE

REFERENCE TO RELATED APPLICATION

This is a continuation-in-part of U.S. patent application No. 08/928,761, filed Sep. 12, 1997, now abandoned, the entirety of which is incorporated herein by reference.

The present invention relates to a lapping machine comprising a revolving turret carrying at least several lapping spindles that can be bought selectively into the machining position so that the spindles can machine, in turn, one and the same cylindrical internal surface of a component.

Patent application FR-A-2 654 969 discloses a bore-lapping machine comprising at least one expansion lap, at least two progressive laps and means for bringing each workpiece in turn to the expansion lap and to each of the progressive laps.

For greater detail regarding expansion lapping, on the one hand, and progressive lapping, on the other hand, reference is specifically made to the above patent application.

According to the aforementioned application, the machine which combines the two types of lap comprises two parallel expansion lapping lines each of which comprises an expansion lap, a progressive lapping line comprising several progressive laps and means for bringing the workpieces from each of the two expansion lapping lines to the progressive lapping line. This machine, which is designed for mass-production, is bulky and expensive.

From another source, a lapping machine is known that comprises a revolving head with a turret carrying only progressive laps, in this instance twelve of these. This machine is also bulky and expensive. Furthermore, a complete lapping operation on one and the same workpiece using this machine with a revolving head is lengthy because of the large number of successive lapping passes that this machine needs to make using its many laps.

The object of the present invention is to provide a general purpose lapping machine with a simple structure, a relatively small bulk and a relatively low cost, which allows a complete lapping operation that may involve the removal of a significant amount of material with high precision, with a monitoring facility, using a small number of machining passes, the complete lapping operation taking a short time.

The lapping machine of the invention comprises a revolving head with a turret carrying several lapping spindles that can be bought selectively into the machining position. The laps borne by the turret comprise spindles of at least two different types, preferably at least one expansion lap and several progressive laps.

The combination of at least one expansion lap and several progressive laps on one and the same turret makes it possible to derive maximum benefit from the advantages of each of the two types of lap, and the small number of laps makes it possible to use a machine of the usual structure with a revolving head of the type which is conventional in the field of machine tools. It is thus possible to make maximum use of existing technology in the field of laps, on the one hand, and in the field of machines with revolving heads with a small number of spindles, on the other hand.

As is well known in itself, an expansion lap requires supplies (electrical and/or fluidic) for expansion control and/or measurement. The invention can make provision for the or each expansion lap to carry, on its non-rotating part, a stationary connector part that can be automatically coupled to a moving connector part when the expansion lap is in the machining position.

Thus it is only when the expansion lap is in the machining position that the supplies are connected via the connector.

In cases where the oscillating movement required for lapping between the lap and the component to be lapped is applied to the revolving head, the moving part of the connector is mounted on a part of the machine that takes part in the oscillating movement.

In cases where, on the other hand, the oscillating movement is applied to the support of the component to be lapped, the moving part of the connector can be mounted on a stationary part of the machine.

It is possible, in the context of the invention, to equip the or each expansion lap with a head for measuring diameter. To allow the lapping to be monitored, the turret of the revolving head may carry at least one spindle which bears a head for measuring diameter in addition to the laps.

The advantage of such devices for measuring diameter, which are mounted on the turret like the laps, lies in the fact that, for measuring, they perform the same movement as the laps perform for machining, along the same axis, and this gives high measurement accuracy.

However, prior art expansion laps including an integral expansion control are relative bulky and heavy, causing a significant imbalance in a revolving turret. To remedy this drawback, in one particular preferred embodiment of the invention, it is proposed to equip the machine with an expansion control part for the expansion lap or laps mounted not on the turret of the revolving head but at a fixed position on the machine. This single expansion control part comprises an expansion control rod penetrating into the revolving head and provided with coupling means at the end inside the head. The or each expansion lap of the turret in this case comprises a lap mount fixed to the turret of the revolving head and including a transmission rod mobile in axial translation having a first end inside the revolving head and carrying coupling means and a second end outside the revolving head for connection to the expansion rod (dagger) of the expansion lap. The two coupling means provided, one on the expansion control rod that does not participate in the rotation of the turret and the other on the or each lap mount fixed to the turret, are designed to be coupled automatically when the lap mount is in the machining position.

This transmission of the expansion control movement via the revolving head is possible on a revolving head such as that sold by PIBOMULTI, Le Locle, Switzerland, for example. In this prior art revolving head, both the rotation movement of the turret and the rotation movement of the laps carried by the turret are produced by a single drive system, for example an electric motor mounted in a fixed position on the machine equipped with the revolving head. A transmission spindle mounted to rotate in the turret support, mobile in axial translation between two positions and driven by the drive system at the end outside the head carries teeth and a positive clutch system inside the head. In one axial position of the lap the teeth engage with teeth on the turret to rotate the latter and in the other axial position the positive clutch system meshes with a complementary positive clutch system provided on each of the laps carried by the turret. On the machine in accordance with the invention the expansion control rod can be mounted inside the transmission lap of the revolving head, being mobile in axial translation relative to the lap, so it is not affected by the axial translation movement of said lap and can selectively rotate the turret and the laps carried by the turret.

The coupling means on the expansion control rod and on the transmission rod preferably comprise a female part on one of the rods in the form of a yoke and a male part on the other rod in the form of a head engaging in the female part when the mount carrying the expansion lap moves to the machining position, said two parts being shaped so that they can, in this position, transmit traction and thrust movements of the expansion control part fixed to the expansion rod (dagger) of the expansion lap.

The male part in the form of a head is preferably in the form of a spherical head to simplify its engagement in the female part in the form of a yoke.

An illustrative and non-limiting embodiment of a lapping machine in accordance with the invention will be described hereinafter with reference to the accompanying diagrammatic drawings; in the drawings.

Figure 1:
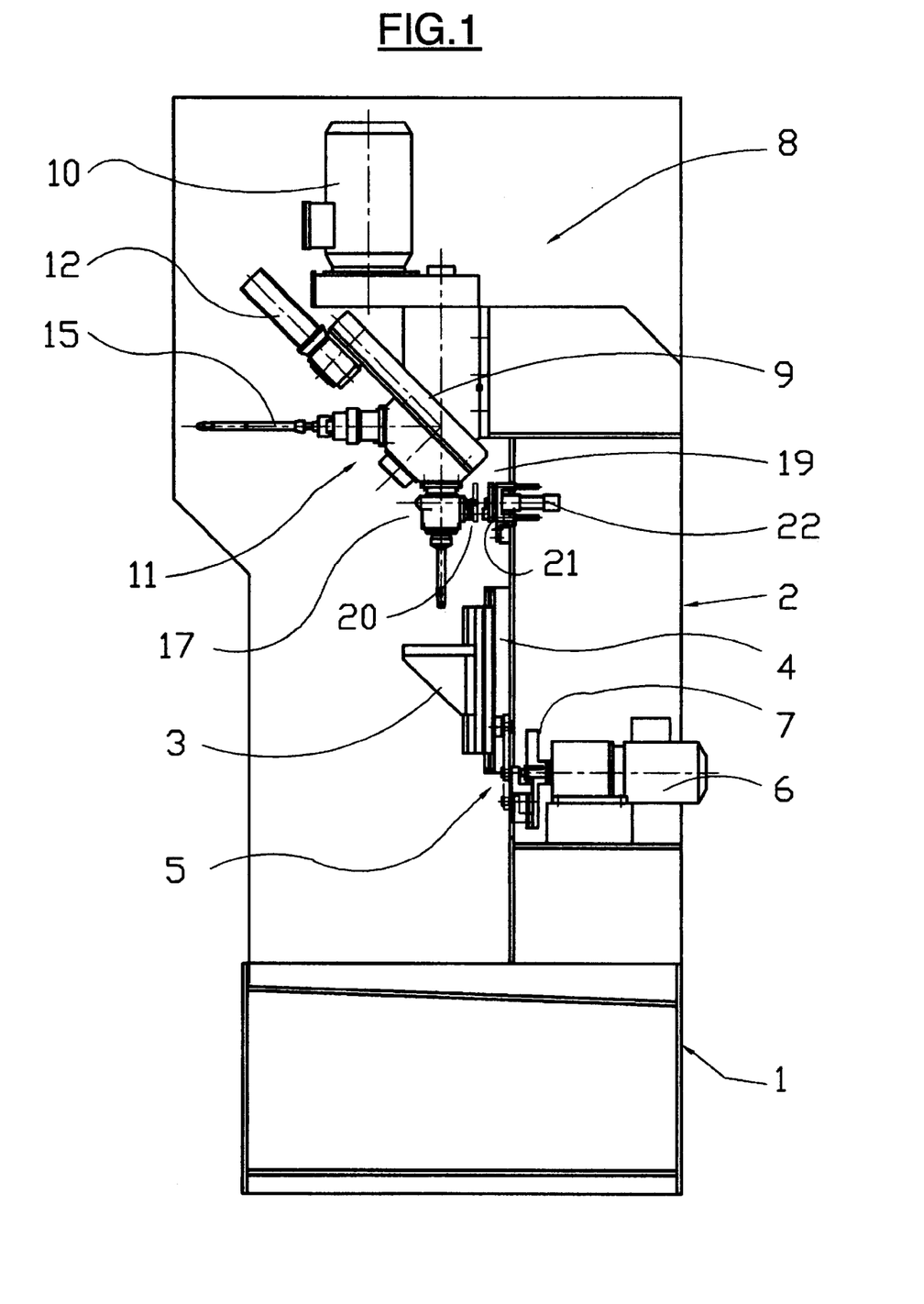
FIG. 1 is an overall lateral view of one embodiment of a machine in accordance with the invention.

The lapping machine as illustrated in FIG. 1 comprise a bed 1 with an upright 2 on which a workpiece carriage 3 is mounted so that it can slide vertically via slides 4 installed here approximately halfway up the upright 2. To produce the oscillating movement needed for lapping, the workpiece carriage 3 may have a vertical reciprocating movement of adjustable amplitude imparted to it by an oscillation-control system 5 which comprises a motor 6 and a crank system 7.

Installed at the top of the upright 2 is a revolving head lapping assembly 8 which comprises a turret holder 9 with a motor 10 for producing the rotational movement needed for lapping. Mounted so that it can rotate on the turret holder 9 is a revolving turret 11 which will be described in greater detail with reference to FIG. 3. The rotation of the turret 11 for selectively bringing the various tools of the turret 11 into the machining position is driven by a motor 12 mounted on the turret holder 9.

Figure 3:
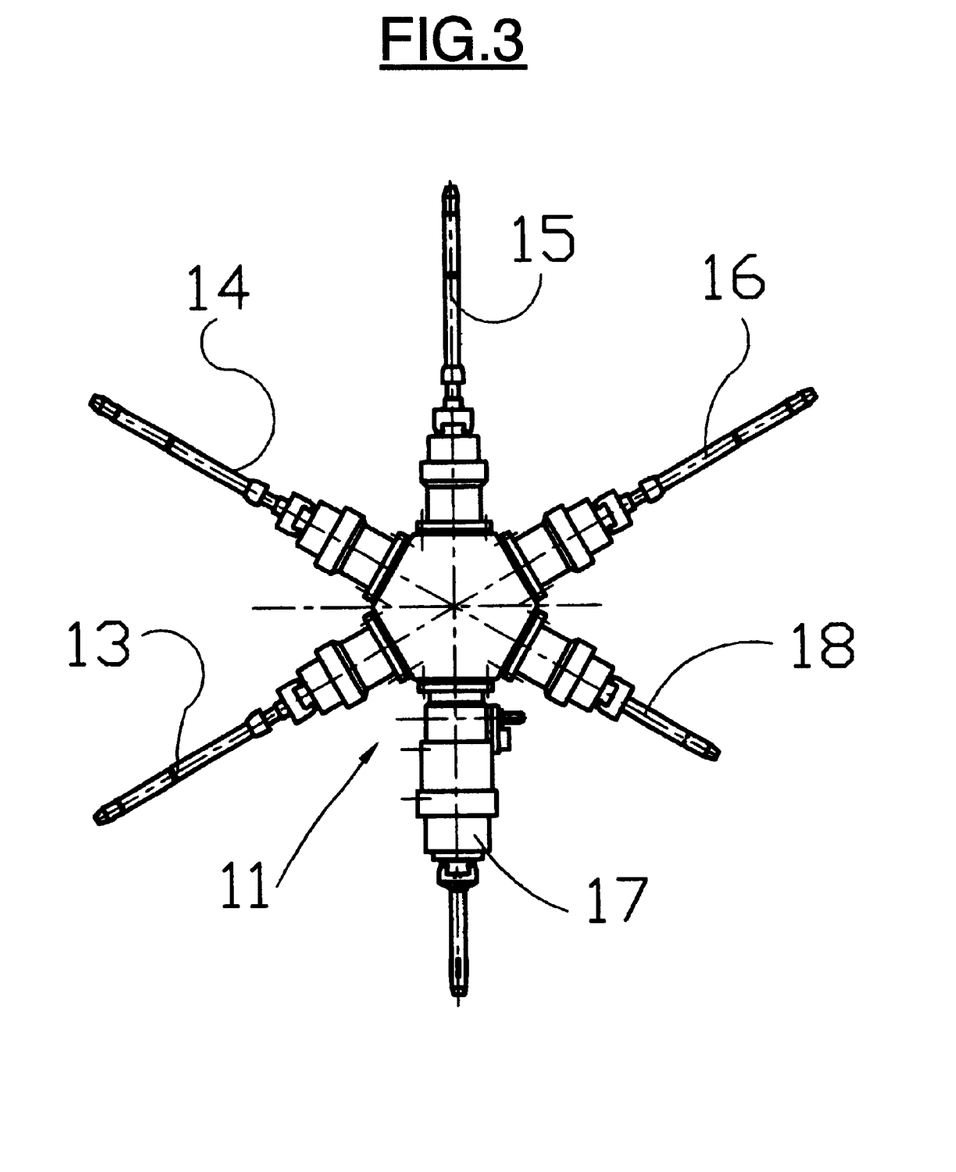
FIG. 3 is a front view of a revolving head with multiple laps of the machine from FIG. 1 or FIG. 2.

As shown in FIG. 3, the turret 11 is a six-position turret carrying six tools which are offset by 60° with respect to each other.

In the example depicted, these tools comprise four progressive laps 13, 14, 15 and 16, one expansion lap 17 and a measurement spindle 18.

The progressive laps 13 to 16 may be of any type known in itself and there is therefore no need to describe them in more detail.

The expansion lap 17 may also be of a type known in itself with expansion control using a hydraulic motor or a fluid ram, for example. The measurement spindle 18 is also of a type known in itself.

To control the expansion of the expansion lap 17 requires an electrical or fluidic supply, depending on the type of control used.

In one embodiment, as illustrated in FIG. 1, this supply is via a connector 19 which comprises a stationary connector part 20 fixed to the spindle 17 and a connector part 21 mounted on the upright 2 and adapted to be moved horizontally by a control 22, for example a fluid ram, so that the moving part 21 of the connector can be engaged with the stationary part 20 when the expansion lap 17 is in the machining position, as depicted in FIG. 1.

Such connectors, be they electrical or fluidic, are well known in themselves and are MCS automatic multiconnectors from STÄUBLI of FR-74 210 FAVERGES FRANCE, for example.

Figure 2:
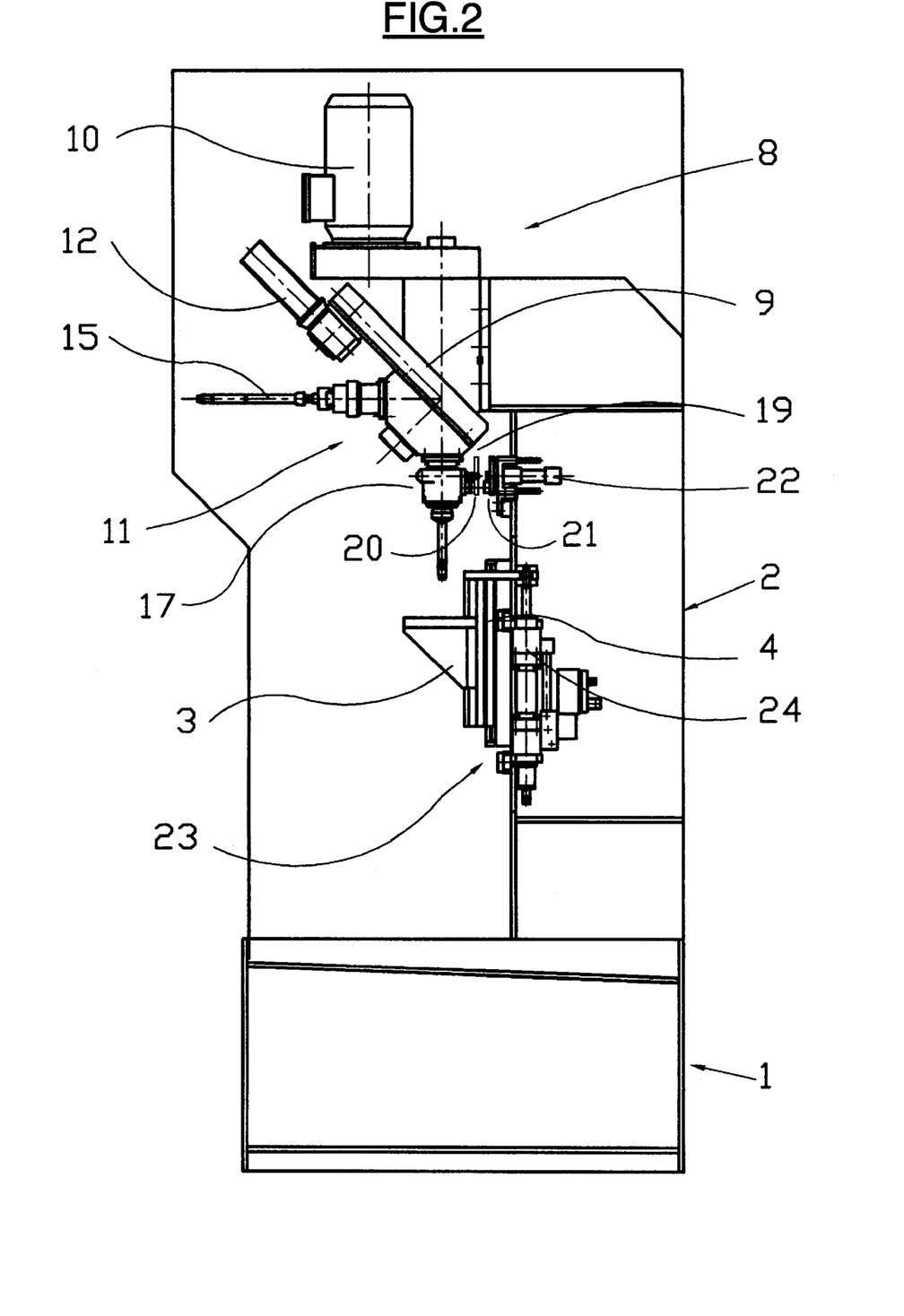
FIG. 2 is a lateral view of a variant of the machine from FIG. 1.

The machine according to FIG. 2 differs from the machine according to FIG. 1 merely in the fact that the workpiece carriage 3 has an oscillating movement imparted to it by an oscillation control 23 with a fluid ram 24.

Figure 4:
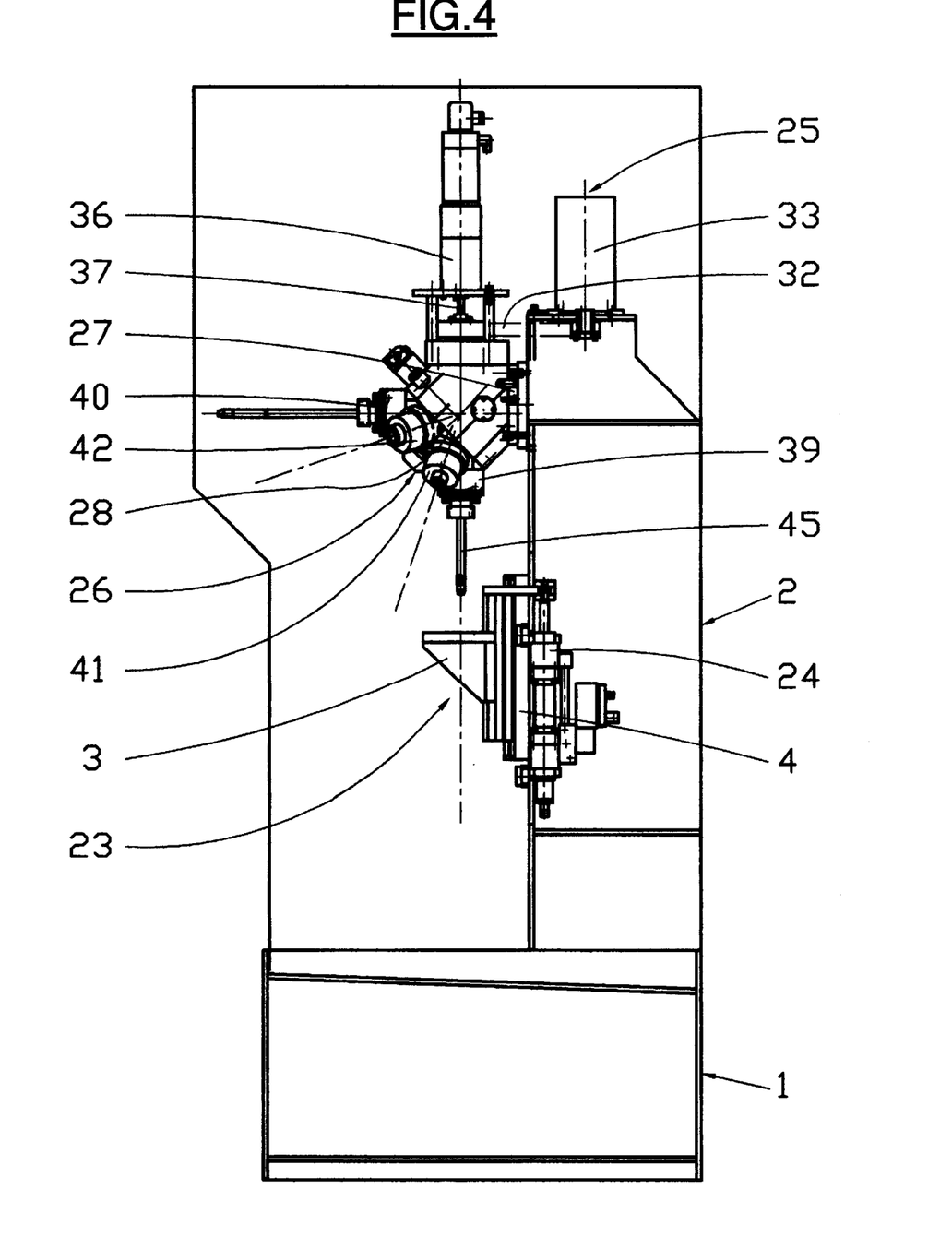
FIG. 4 is a lateral view of a preferred embodiment of a machine in accordance with the invention.
Figure 5:
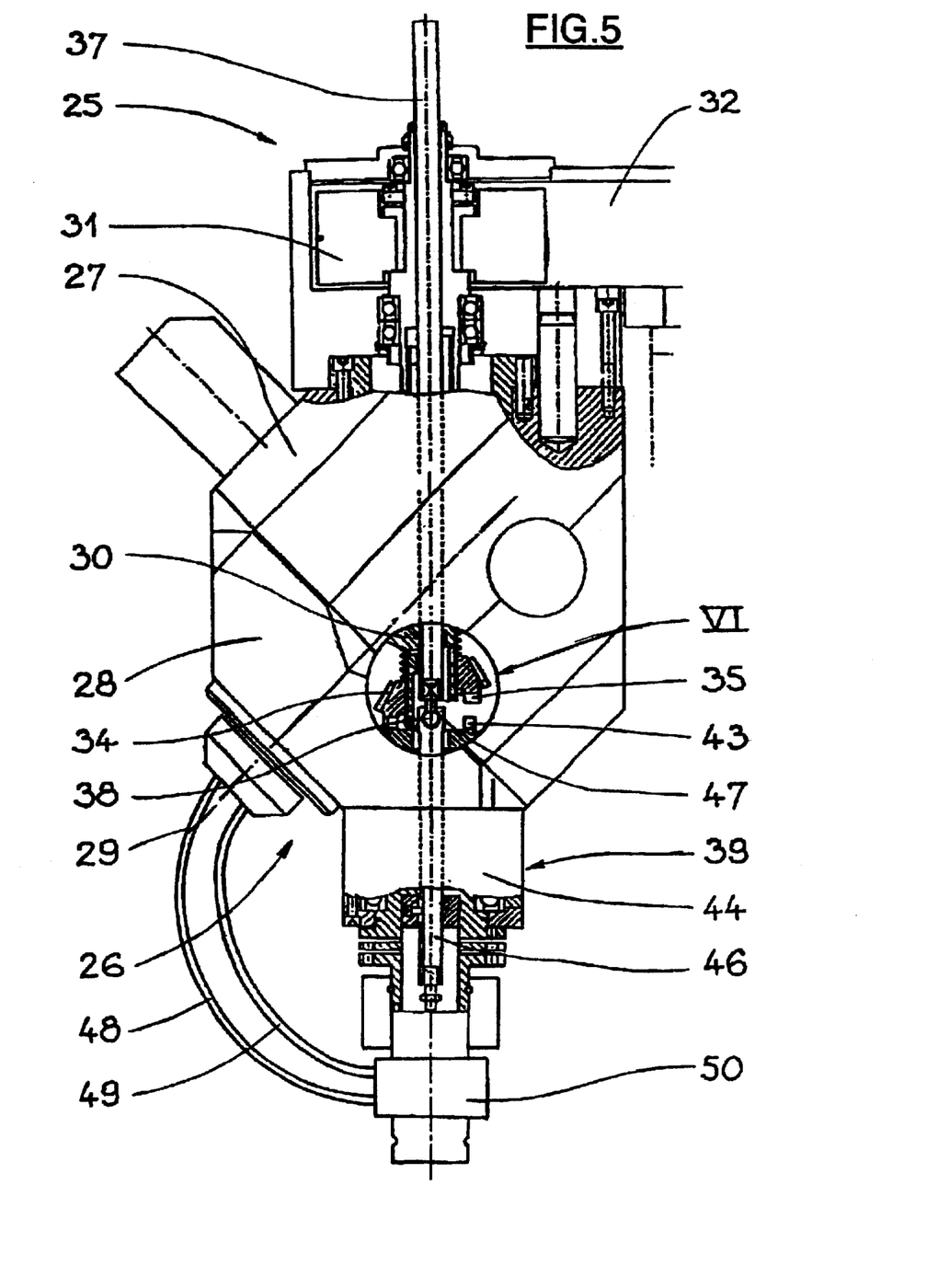
FIG. 5 is lateral view to a larger scale and in section of the revolving head of the machine from FIG. 4.
Figure 6:
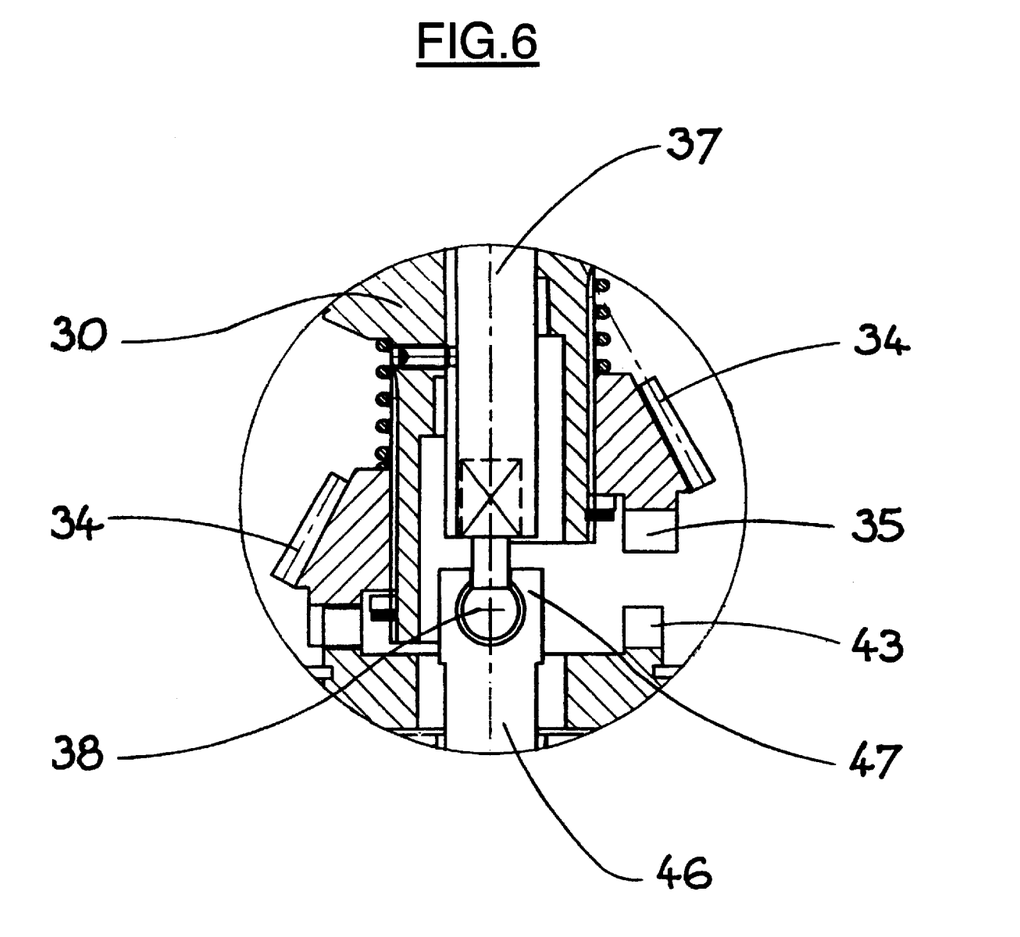
FIG. 6 shows the detail VI of the turret part from FIG. 5 to a larger scale.

The lapping machine shown in FIGS. 4 through 6 has the same general structure as the machine shown in FIG. 2 (bed 1, upright 2, workpiece carriage 3 mounted so that it can slide vertically via slides 4 and to which an oscillating movement is imparted by an oscillation control 23 with a fluid ram 24), but differs from it by virtue of a particular lapping assembly 25.

The lapping assembly 25 comprises a revolving head 26 made up of a turret holder 27 and a turret 28. The turret holder 27 mounted at a stationary position on the upright 2, so as to be able to turn about an axis 29 inclined at 45° to the vertical, has a rotary spindle 30 passed vertically through it and carrying, above the turret holder 27, a pulleywheel 31 for driving it via a drive belt 32 from an electric motor 33 fixed to the upright 2. The spindle 30 can be moved in axial translation by a control, not shown, between a low position (shown to the left of the axis of the spindle in FIG. 5) and a high position (shown to the right of the axis of the spindle in FIG. 5). At its bottom end, substantially in the plane where the turret 28 joins onto the turret holder 27, the spindle 30 carries teeth 34 and positive clutch claws 35.

In both its axial positions the spindle 30 is rotated by the motor 33 which is preferably a reversible variable speed motor.

Above the turret holder 27, on the axis of the spindle 30, is installed an expansion control 36, for example an electric or hydraulic control, which operates axially on an expansion control rod 37 passing through the pulleywheel 31 and the spindle 30 of the turret holder 27. At its bottom end, in the plane where the turret 28 joins onto the turret holder 27, the rod 37 has a spherical head 38.

Like the turret of the preceding embodiment, the turret 27 has a plurality of spindles, for example two expansion laps 39 and 40 and a plurality of progressive laps of which only laps 41 and 42 can be seen in FIG. 4.

Given that it must be rotated, each lap comprises in the part inside in the turret 28 positive clutch claws 43 which, when the lap in question is in the machining position and therefore in alignment with the spindle 30 of the turret support 27, face the positive clutch claws 35 of the spindle 30 and are engaged with said positive clutch claws 35 when the spindle 30 occupies the low position shown to the left of the axis of the spindle in FIGS. 5 and 6. In this low position the teeth 34 on the spindle 30 are inoperative.

Consequently, in this position, the spindle 30 driven by the motor 33 rotates the lap in the machining position.

In the high position of the spindle 30, shown to the right of the axis of the spindle 30 in FIGS. 5 and 6, the positive clutch claws 35 that are a distance above positive clutch claws 43 of the laps and the teeth 34 mesh with drive teeth, not shown, on the turret 28 so that rotation of the spindle 30 rotates the turret 28.

Revolving heads of this type, with rotation of the turret and the spindle driven by the same motor, are known in themselves and are sold by PIBOMULTI, Le Locle, Switzerland, for example.

As shown in FIG. 5 in the case of the spindle 39, each expansion lap comprises a simple lap mount 44, the expansion control part 36, common to all the expansion laps being displaced to a position above the revolving head 26. The mount 44 to which the lap 45 is fixed (which can be seen in FIG. 4 but is not shown in FIG. 5) encloses a transmission rod 46 mobile in axial translation and having at its upper end a yoke 47 adapted to receive the spherical head 38 of the expansion control rod 37. The yoke 47 is designed so that when it is coupled to the spherical head 38, which occurs automatically when the lap is brought into the machining position by rotation of the turret 28, the two rods 37 and 46 are coupled together in axial translation and can therefore transmit traction movement and thrust movement of the expansion control 36 to the lap 45 fixed to the mount 44.

The other spindles that can be mounted on the turret 28 and which are not expansion laps (in this instance progressive laps 41, 42 and, where applicable, measuring spindles, brushing spindles) do not have the transmission rod 46 with the result that when these other spindles move to the machining position they are not coupled to the head 38 of the expansion control rod 37.

Where a supply of fluid to the spindle is necessary for measurement (either at an expansion lap equipped with an integral diameter measuring system or at a diameter measuring spindle), the supply can be provided either via an Ellin connector 19 used in the embodiment of FIGS. 1 through 3 or via the revolving head 26. In this case, as shown in FIG. 5, feed and return hoses 48, 49 can exit the turret 28 at the level of the spindle 29 to extend to a rotary seal 50 disposed between the mount 44 and the expansion lap with integral diameter measurement. In the case of a diameter measuring spindle that is not driven in rotation, two corresponding hoses can be connected directly to the spindle.

It goes without saying that the embodiments depicted and described have been given merely by way of non-limiting illustrative example and that many modifications and variations are possible within the scope of the invention.

Thus lapping could take place along a horizontal axis rather than a vertical axis. The oscillation control could act on the revolving head rather than on a workpiece carriage 3. Instead of housing one expansion lap, four progressive laps and one measuring spindle 18, the total number of spindles on the turret could be different. It would thus be possible, within the scope of the invention, to use a four-spindle turret, for example, comprising one expansion lap with built-in measurement capability, for example according to European Patent Application 430 817, and three progressive laps, or any other combination of spindles of different types.

What is claimed is:

1. A lapping machine comprising a workpiece carriage (3) and a revolving head with a turret (11, 28) carrying a plurality of spindles (13 through 17, 39 through 42) which can be moved selectively to a machining position, said spindles carried by the turret being of at least two different types, said workpiece carriage being imparted with an oscillatory movement to provide oscillatory movement between the workpiece and a spindle in said machining position.

2. The machine as claimed in claim 1 characterized in that the spindles carried by the turret comprise at least one expansion lap (17; 39, 40) and a plurality of progressive laps (13, 14, 15, 16; 41, 42).

3. The machine as claimed in claim 2, wherein the expansion lap has a non-rotating part and an integral expansion control, said expansion control including a fixed connector part (20) disposed on the non-rotating part of the expansion lap (17) and a mobile connector part (21) disposed on a fixed part (2) of the machine so that said two connector parts can be coupled automatically to supply the expansion control when the expansion lap is in the machining position.

4. The lapping machine according to claim 1, wherein said turret is also provided with a spindle (18) for measuring diameters.

5. The lapping machine according to claim 1, wherein said spindles carried by the turret comprise an expansion lap, said expansion lap including a diameter measuring system.

6. A lapping machine comprising a workpiece carriage (3) and a revolving head with a turret (11, 28) carrying a plurality of spindles (13 through 17, 39 through 42) which can be moved selectively to a machining position, said spindles carried by the turret being of at least two different types and including an expansion lap, an expansion control part (36) for the expansion lap mounted in a fixed position on the machine and comprising an expansion control rod (37) entering the revolving head (26) and provided with a coupling (38) inside the revolving head, said expansion lap (39, 40) comprising a lap mount (4) fixed to the turret (28) and including a transmission rod (46) having a first end inside the turret and carrying a coupling (47) and a second end outside the turret for connecting the expansion rod to the expansion lap, said two couplings being designed to be coupled when the lap mount (44) is in the machining position.

7. The machine as claimed in claim 6 characterized in that the coupling means comprise a female part (47) in the form of a yoke and a male part (38) in the form of a head engaging in said female part in the form of a yoke when the lap mount (44) moves to the machining position so that the coupling means can transmit traction and thrust forces from the expansion control (36) to the expansion lap (45).

8. The machine as claimed in claim 7 characterized in that said male part is in the form of a spherical head (38).

9. A lapping machine comprising a workpiece carriage (3) and a revolving head with a turret (11, 28) carrying a plurality of spindles (13 through 17, 39 through 42) which can be moved selectively to a machining position, said spindles carried by the turret being of at least two different types, and including an expansion lap, said expansion lap including a diameter measuring system.

10. A lapping machine for machining an internal cylindrical surface of a workpiece, comprising:
   a fixed part;
   a workpiece carriage;
   a revolving head comprising a turret holder and a turret rotatably mounted on said turret holder, said turret carrying a plurality of laps of different types including at least one expansion lap;
   a turret revolver for revolving said turret for selectively bringing one of said laps into a machining position;
   a lap driver for rotatably driving the lap respectively brought into said machining position;
   an expansion controller for said expansion lap; and
   an oscillation controller for producing an oscillatory translation movement between said workpiece and said lap brought into said machining position;
   said workpiece carriage being slidably mounted on said fixed part of the machine, said oscillation controller being stationarily mounted on said fixed part of the machine so as to impart said oscillatory translation movement to said slidable workpiece carriage.

11. The machine of claim 10, wherein said expansion lap includes a non-rotating part, said expansion lap including an integral expansion controller which has a fixed connector portion and a movable connector portion, said fixed connector portion being disposed on said non-rotating part of the expansion lap, said movable connector portion being movably disposed on said fixed part of the machine, and a connector controller for engaging said movable connector portion to automatically couple said movable connector portion with said fixed connector portion when said expansion lap is brought into said machining position.

12. The machine of claim 10, wherein said expansion controller includes a stationary expansion control portion mounted on said fixed part of the machine and an expansion control rod entering said turret holder of said revolving head and provided with a first coupling inside said revolving head, said expansion lap including a lap mount fixed to said turret, a transmission rod having a first end located inside said turret and carrying a second coupling, and a second end located outside said turret and connected to said expansion lap, said first and second couplings being automatically coupled when said lap mount is brought into said machining position.

13. The machine of claim 12 wherein said transmission rod is axially movable, said first and second couplings including a female portion in the form of a yoke and a male portion in the form of a spherical head which, when the lap mount is brought into said machining position, engages with said female portion so that said couplings transmit traction and thrust forces from said stationary expansion control portion to said expansion lap.

14. The machine of claim 10, wherein said turret further carries a spindle for measuring inside diameters.

15. The machine of claim 10, wherein said expansion lap includes a diameter measuring system.

16. The machine of claim 10, wherein said laps include a plurality of progressive laps.

* * * * *